April 2, 1963 F. S. BURRELL 3,083,664
SHIP SOUND SIMULATOR
Filed July 27, 1960
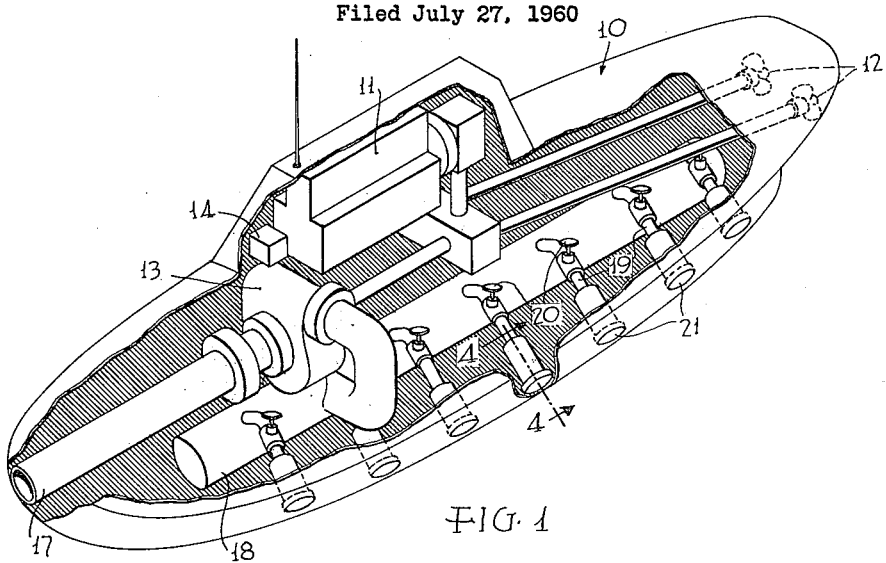
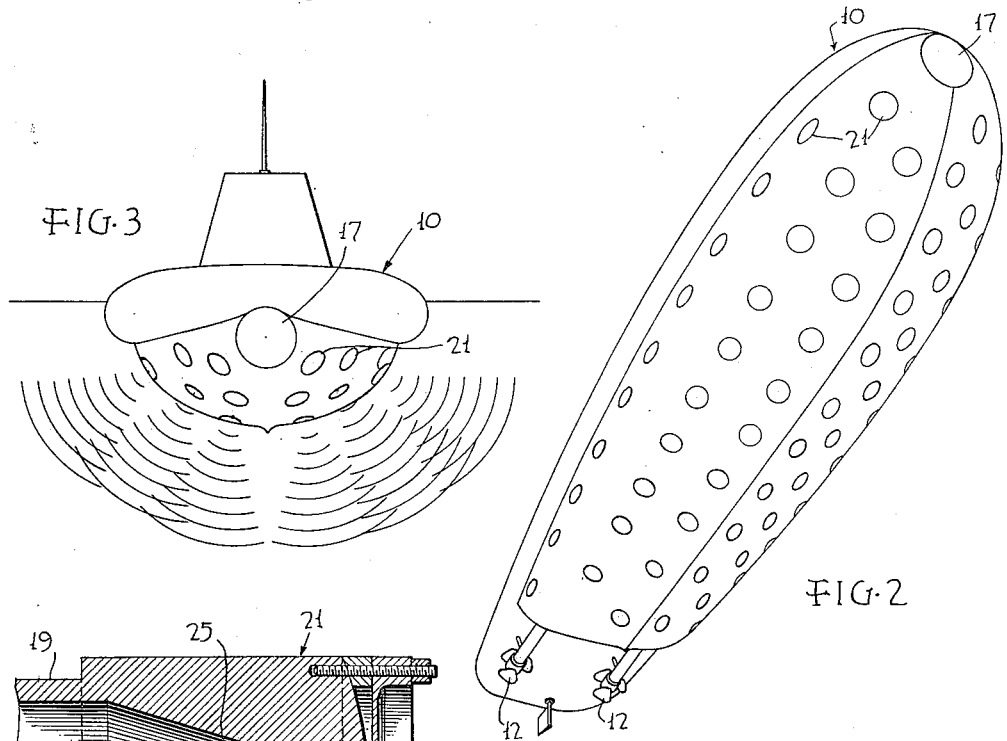
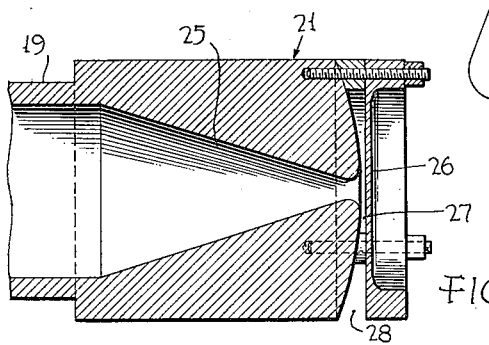
INVENTOR.
Frederick S. Burrell.
BY Wm. R. Glisson
ATTORNEY 3,083,664
SHIP SOUND SIMULATOR
Frederick S. Burrell, Wallingford, Pa., assignor to The Budd Company, Philadelphia, Pa., a corporation of Pennsylvania
Filed July 27, 1960, Ser. No. 45,753
3 Claims. (Cl. 114—.5)

This invention relates to a ship sound simulator and has for an object the provision of improvements in this art.

One of the particular objects of the invention is to provide a self-propelled device having means for closely simulating the sounds made by a ship moving in water.

Another object is to provide means for simulating the diversified hull and propeller sounds in water.

Another object is to provide a water-borne device of sufficient size to simulate a ship.

Another object is to provide fluid-operated ship sound simulating means which may be operated by circulating sea water.

The above and other objects and advantages of the invention will be apparent from the following description of an exemplary embodiment, reference being made to the accompanying drawings wherein:

FIG. 1 is a perspective view of a device or vessel embodying the invention;

FIG. 2 is a perspective view of the bottom of the vessel;

FIG. 3 is a front end elevation with an indication of sound waves generated by the device; and FIG. 4 is an enlarged section, on the line 4—4 of FIG. 1, through one of the sound generating units.

As shown herein, a vessel 10 is used as a vehicle for conveying the sound simulating means. For best results the vessel must be of considerable size, say thirty or thirty five feet long because sound detecting facilities are now so refined that smaller ship-like objects are disregarded.

The vessel 10 is provided with a power unit 11 which may be of various types but preferably a diesel engine. It drives the propellers 12 and a fluid circulating pump 13. Controls 14 are provided for guiding the vessel either remotely or by coded record means carried by the vessel.

The pump 13 takes in sea water by way of an intake pipe 17 and forces it into a manifold 18 which, by a plurality of pipes 19 with selective controls 20, delivers water to the sound simulating devices 21 which are distributed all about over the hull of the vessel. For simplicity, the valves are shown as the hand operated type but they may be of a type controlled remotely or by coded record carried on the vessel.

One of the sound producing devices 21 is shown in FIG. 4. It includes a nozzle 25 which directs a high velocity jet of water against a vibratory diaphragm 26, the water turning suddenly as it strikes the intermediate portion of the face of the diaphragm and flowing out through a restricted space 27 which enlarges, as at 28, toward the periphery. The flow of the water over the surface of the diaphragm causes it to vibrate and impart compression waves of considerable magnitude to the body of water which contacts the outer surface of the diaphragm.

In addition to the sound generated directly by the diaphragm the outflow of water produces sounds which simulate the movement of a ship's hull through the water. Of course, the actual vessel hull in the present case produces its own sound in the water.

Further, the flow of water can be so regulated by control valve 20 as to closely reproduce the cavitation sounds which are characteristic of ships' propellers. Of course, the actual propellers of the ship here add their own sound in the water but lack the simulation of the propellers of a large vessel which is supplied by the sound generating devices provided hereby.

The different sound generating devices can be separately formed and adjusted so as to give a variety of sounds associated with a ship or even with different types of ships. I have made considerable studies of the sound generating characteristics of this fluid nozzle diaphragm type of device but it is not believed to be necessary to provide such information herein for a proper understanding of the equipment and its operation.

While one embodiment of the invention has been described for purposes of illustration it is to be understood that there may be various embodiments and modifications within the general scope of the invention.

What is claimed is:

1. A sound decoy device for artificially producing the sound of a large ship's hull in water comprising,
    a hull of a size sufficient to return indicating responses to detecting devices such as radar and sonar,
    a water pump having its fluid intake connected to the outside of said hull and its fluid discharge connected to a supply manifold inside the hull,
    a converging jet nozzle connected to said manifold for increasing the velocity of fluid supplied therefrom,
    said jet nozzle being mounted to the side of said hull with its discharge outside of said hull,
    a substantially flat vibratory diaphragm mounted to the discharge face of said jet nozzle and spaced apart therefrom parallel to the outside of said hull to produce an outflow of water between said hull and said diaphragm simulating the sound of a ship's hull in water,
    and a radially diverging annular space between said diaphragm and the face of said jet nozzle for creating an expanding fluid passage exhausting outside of said hull whereby different frequencies of vibration indicative of different ships may be imparted to said diaphragm by varying the velocity of said fluid from said jet.

2. A sound decoy device as set forth in claim 1 in which said jet nozzle and said radially diverging annular space together form a converging-diverging jet nozzle in which cavitation may be induced by supplying said fluid at high velocity through said converging-diverging jet nozzle,
    said cavitation being indicative of the sound created by the screw of large ships.

3. A sound decoy system for artifically producing the sound of a large ship in water comprising,
    a water pump having its fluid intake connected to said water and its fluid discharge connected to a supply manifold,
    a plurality of identical converging jet nozzles connected to a said manifold for increasing the velocity of said fluid supplied thereby,
    each of said jet nozzles consisting of conical shaped axially converging passages leading to a small orifice and having an axially diverging and rounded face at the discharge of said orifice,
    a substantially flat diaphragm mounted opposite said rounded face and said orifice in the path of fluid discharge from said orifice to form a radially diverging annular space between said diaphragm and said face to produce an outflow of water between said hull and said diaphragm simulating the sound of a ship's hull in water,
    and valve means for controlling the flow of said fluid in said jet nozzles to vary the frequency of vibration of said vibratory diaphragm mounted to the discharge face of said nozzle and for further creating cavitation noise simulating a ship's screw in water.

References Cited in the file of this patent
UNITED STATES PATENTS

| | | |
|---|---|---|
| 1,080,098 | Blake | Dec. 2, 1913 |
| 1,182,874 | Haneklaus | May 9, 1916 |
| 1,475,385 | Hecht | Nov. 27, 1923 |
| 1,488,837 | Rydberg | Apr. 1, 1924 |
| 1,507,956 | Du Bois-Reymond | Sept. 9, 1924 |
| 2,164,651 | Haskin | July 4, 1939 |
| 2,397,107 | Hammond | Mar. 26, 1946 |
| 2,730,065 | Piper | Jan. 10, 1956 |